G. W. DENTON.
JOURNAL BEARING.
APPLICATION FILED SEPT. 7, 1920.
1,381,811.
Patented June 14, 1921.
2 SHEETS—SHEET 1.
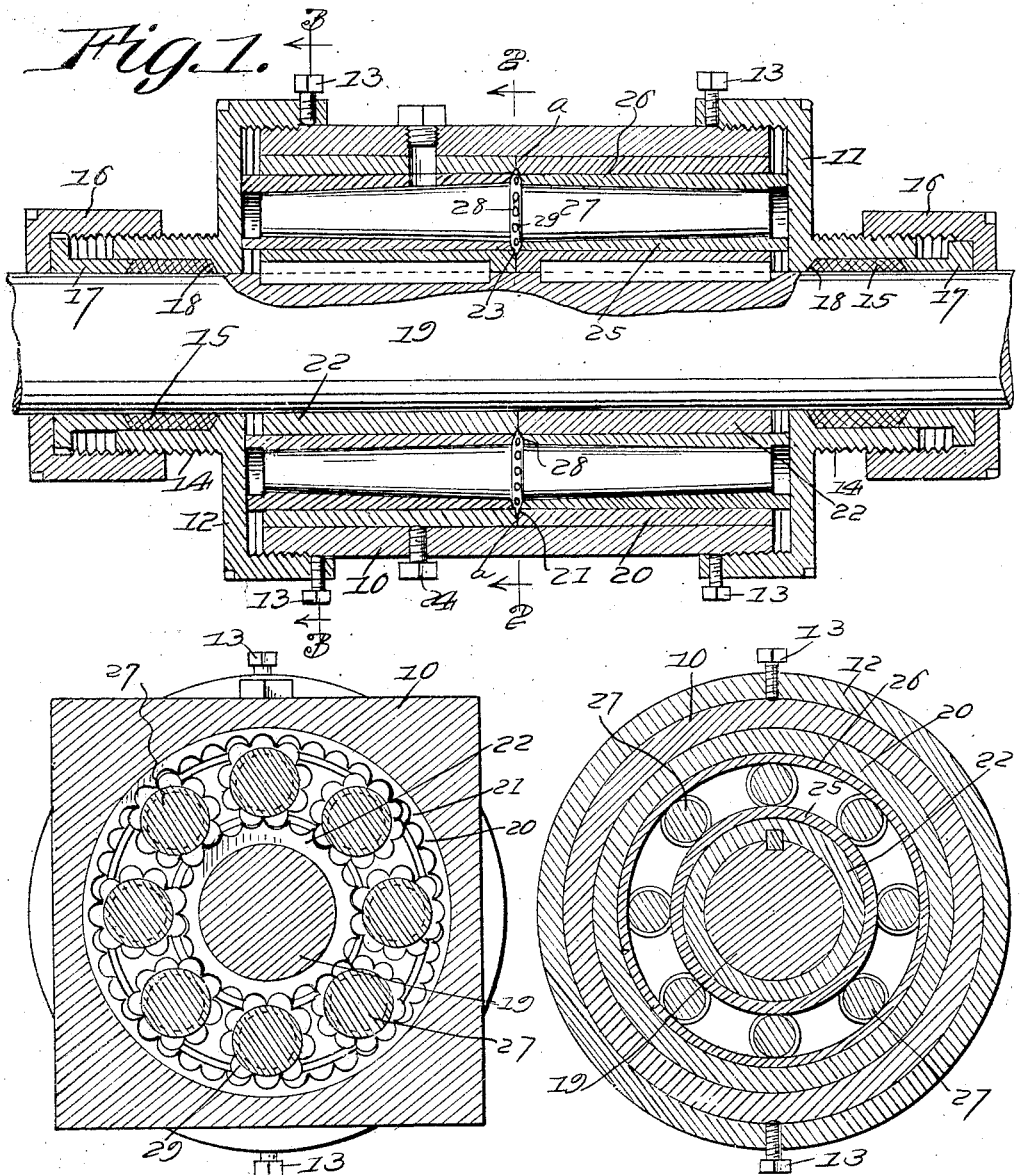

G. W. DENTON.
JOURNAL BEARING.
APPLICATION FILED SEPT. 7, 1920.

1,381,811.

Patented June 14, 1921.
2 SHEETS—SHEET 2.

Inventor
G. W. Denton.
By Watson E. Coleman
Attorney

UNITED STATES PATENT OFFICE.

GEORGE W. DENTON, OF SOUTH BEND, INDIANA.

JOURNAL-BEARING.

1,381,811.   Specification of Letters Patent.   Patented June 14, 1921.

Application filed September 7, 1920. Serial No. 408,584.

*To all whom it may concern:*

Be it known that I, GEORGE W. DENTON, a citizen of the United States, residing at South Bend, in the county of St. Joseph and State of Indiana, have invented certain new and useful Improvements in Journal-Bearings, of which the following is a specification, reference being had to the accompanying drawings.

This invention relates to journal bearings, and particularly to roller bearings of the character illustrated in my Patent #1,216,781, granted to me on February 20, 1917.

The general object of the present invention is to improve upon the journal bearing illustrated in the above named patent by providing means whereby the wear on the rollers or on the sleeves or housings surrounding the rollers may be taken up so that from time to time the bearing may be adjusted to cause the bearing to again run as tightly as it originally did.

A further object is to provide improved means for keeping out all dust and dirt from the interior of the bearing.

A further object is to provide a bearing of this character which is particularly adapted to be used for journal bearings for box cars and conform to the standard design for journals of this character.

Other objects will appear in the course of the following description.

My invention is illustrated in the accompanying drawings, wherein:—

Figure 1 is a longitudinal sectional view of a journal bearing constructed in accordance with my invention;

Fig. 2 is a section on the line 2—2 of Fig. 1;

Fig. 3 is a section on the line 3—3 of Fig. 1, said section being taken at the junction of the two sections of the sleeve 33;

Fig. 4 is a longitudinal fragmentary sectional view of one of the rollers 27;

Figure 5:
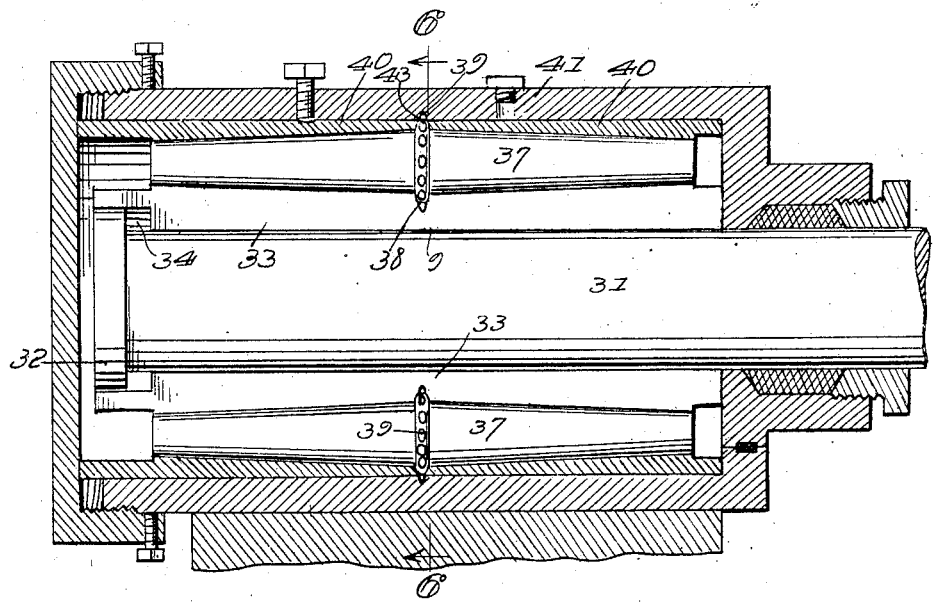
Fig. 5 is a longitudinal sectional view of a journal bearing for a car axle.

As stated in my patent, the general object of this invention is to provide a very simple and effective journal bearing which will do away with the use of oil-soaked packing and eliminate to a large degree the chance of railway cars being set on fire by hot boxes, and in general design the bearing which I have illustrated in the accompanying figures is that illustrated in my prior patent.

Referring to these drawings, 10 designates the journal box itself, which is preferably circular in form to provide a cylindrical chamber closed at one end by the detachable head 11 and at the other end by a detachable head 12. These heads are flanged and have screw-threaded engagement with the exterior of the cylindrical body 10 and are further held in place by set screws 13. Each of these heads is formed with an exteriorly screw-threaded neck 14, this neck being cut away on its inner face for the reception of packing 15 and being engaged by an interiorly screw-threaded packing cap 16. Disposed within the cap is the gland 17 which has a beveled face bearing against the outer end of the packing. The inner end of the packing bears against a beveled shoulder 18 at the junction of the neck with the head. The shaft or axle 19 extends through the caps 16, through the packing 15, and through the center of the body 10. It will be noted that there is a space between the inner faces of the heads 11 and the end faces of the body 10.

Disposed within the body 10 and fitting more or less snugly thereto is a sleeve 20 which has a length corresponding to the length of the body 10. The inner face of this sleeve at its middle is formed with a plurality of semi-circular, concave recesses 21 or pockets. Keyed upon the shaft 19 is a sleeve 22 having a length equal to that of the body 10, which at its middle is also formed with corresponding semi-circular concave pockets 23 which are, of course, immediately opposite the pockets 21. The sleeve 20 and the sleeve 22 are formed in two sections which abut at these pockets 21 and 23 on the line *a—a*, and the sleeve sections 20 are held in place by set screws 24 passing through the body 10. Disposed within the sleeves 20 and 22 are sleeve sections 25 and 26, each sleeve being formed in two lateral sections divided on the line *a—a*, these sleeves, however, being longer than the sleeves 20 and 22 and abutting against the inner faces of the heads 11 and 12. The outer face of the sleeve 26 is concentric to the body 10 and the sleeve 20, but the inner faces of the sleeve sections 26 are tapered. The inner faces of the sleeve sections 25 are concentric to the body 10 and the sleeve sections 20 and 22, but their outer faces are tapered.

Disposed in the space between the sleeve sections 25 and 26 are a series of tapered rollers 27 having a length equal to the length of the body 10, each of these rollers at its middle being provided with a flange 28, each flange 28 being formed at uniformly spaced intervals with outwardly projecting protuberances 29 which may be termed sprocket teeth and which are adapted to engage in the depressions or pockets 23 and 29 respectively. The confronting end faces of the two sections of sleeve 25 and the confronting end faces of the two sections of sleeve 26 are concavely beveled to fit against the side walls of the flange 28. The roller bearings are disposed, as illustrated in Fig. 2, at spaced intervals from each other, and the purpose of the protuberances 29, which form the sprocket teeth, is to engage with the pockets 21 and 23 and hold the anti-friction rollers in spaced relation to each other and prevent them from coming in contact with each other, thus eliminating the friction of the rollers upon each other. These pockets and interengaging protuberances act to hold the rollers at spaced intervals all around the shaft and in the raceway formed between the sleeves 25 and 26, while the purpose of the flanges 28 is to prevent any longitudinal movement of the rollers relative to the shaft and relative to the boxing so that the ends of the rollers will be held in spaced relation to the heads 11 and 12 and thus eliminate any friction of the rollers against the ends of the boxing.

It will be obvious that the tapered sleeve sections 25 and 26 serve as a take-up in case the rollers or the sleeves wear, the ends of these sleeve sections, against which the flange 28 bears, wearing in about the same proportion as the surfaces of the rollers or the surfaces of the sleeves. By tightening up one or both of the caps 11 and 12, the sleeves 25 and 26 which are subject to wear will be forced inward and the taper on these sleeve sections will take up the wear and the bearing will again run tight as it was originally. The packing glands carried by the heads will keep out all dust and dirt.

Figure 6:
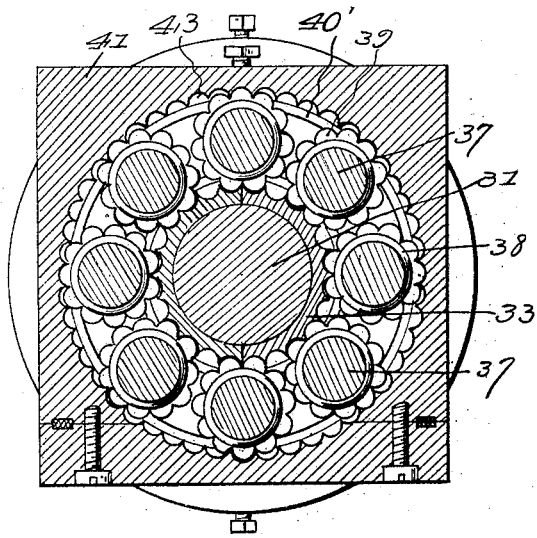
Fig. 6 is a section on the line 6—6 of Fig. 5.

In Fig. 5 I show a modification of my invention which is particularly applicable to standard journal bearings for box cars. In this construction, the journal 31, which is flanged at one end, as at 32, is carried within a sleeve 33 which is split longitudinally (see Fig. 6), one end of this sleeve being cut away, as at 34, to accommodate the flange 32 and permit a slight longitudinal movement of the axle 31. The exterior of the sleeve 33 is formed with pockets 35 heretofore described for the flange and sprocket teeth on the rollers. Exterior of the sleeve 33 are disposed the rollers 37 which are constructed as heretofore described and formed with a flange 38 and the teeth 39, and exterior to these rollers are the sleeve sections 40 which extend beyond the rollers and bear against the end walls of the boxing. These sleeve sections 40 are of uniform diameter upon their exterior faces, but the inner faces are inclined so that each sleeve section is thicker at its outer end than it is at its inner end, this inclination conforming to the taper of the rollers 37. Exterior to the sleeve sections 40 there is the body 41 which corresponds to the body 10 and is attached to the end head 44 by screw-threads and set screws as heretofore described. This body 41 is also formed with pockets 43 to receive the sprocket teeth on the rollers. The sleeve 33 is gradually reduced in diameter toward its middle, as illustrated in Fig. 5. The principle of operation of this construction is the same as that heretofore described. The sleeve 33 is formed in longitudinal sections in order that it may be made over the flange on the journal.

It will be obvious that this improved bearing may be used on all manner of machines and is particularly adapted to form the journal bearings for railway cars, and that it does away with the necessity of using oil-soaked cotton waste, thus obviating the danger of the boxing getting hot and setting fire to the waste. This bearing uses hard oil or other lubricant, and the lubricant will last a considerably greater length of time than usual and thus a saving will be effected.

Attention is particularly called to the fact that the pockets for the teeth of the flanges on the rollers are set so close together that each tooth or protuberance of a roller must commence to enter a pocket before the next adjacent protuberance or tooth leaves its pocket, as unless this is the case, there will be an instant when no protuberances will enter the pockets and the rollers could, therefore, shift toward or from each other and get out of line with the pockets. By arranging the teeth and pockets so that one tooth will not completely leave its pocket until the next adjacent tooth has entered the pocket, there is no danger of the rollers having relative movement but they will at all times be spaced properly from each other.

I claim:—

1. In combination with a journal and a journal box having its inside face concentric to the journal, bearing rollers disposed within the journal box, and means for holding the rollers in circumferential spaced relation, of sleeve sections disposed in engagement with the rollers, said sleeve sections being tapered and being longitudinally adjustable to take up wear, and means exterior of the journal box whereby said sleeve sections may be shifted inward to take up wear.

2. In combination with a journal and a journal box having its inside face concentric to the journal, bearing rollers disposed within the journal box, and means for holding the rollers in circumferential spaced relation, of sleeve sections disposed in engagement with the rollers, said sleeve sections being tapered and being longitudinally adjustable to take up wear, and a head adjustable with relation to the body of the journal box and in a direction longitudinal thereof to engage one of the sleeve sections to thereby shift it longitudinally to take up wear.

3. In combination with a journal and a journal box having its inside face concentric to the journal, bearing rollers disposed within the journal box, and means for holding the rollers in circumferential spaced relation, of sleeve sections disposed in engagement with the rollers, said sleeve sections being tapered and being longitudinally adjustable to take up wear, and oppositely disposed heads adjustable longitudinally of and with relation to the journal box, the heads being engageable with the outer ends of the sleeve sections to force them toward each other to thereby take up wear.

4. In combination with a journal and a journal box having its inside face concentric to the journal, bearing rollers disposed within the journal box, and means for holding the rollers in circumferential spaced relation, of sleeve sections disposed in engagement with the rollers, said sleeve sections being tapered and being longitudinally adjustable to take up wear, and heads disposed at the ends of the journal box and having screw-threaded engagement therewith whereby the heads may be shifted longitudinally of the journal box, said heads being engageable with the opposite ends of the sleeve sections, longitudinally adjust the sleeve sections, and take up wear.

5. The combination with a journal and journal box, anti-friction rollers disposed between the journal and the journal box, means for holding said rollers in circumferential spaced relation to each other, of sleeve sections disposed between the journal and the rollers and longitudinally shiftable to take up wear, sleeve sections disposed exteriorly of the rollers and longitudinally shiftable to take up wear, said sleeve sections being longitudinally tapered, and heads having longitudinal adjustment upon the journal box and engaging the ends of said sleeve sections, whereby said sleeve sections may be forced inward to thereby take up wear.

6. The combination with a journal and a journal box, anti-friction rollers disposed between the journal and journal box, each of said rollers being tapered in opposite directions and having means whereby they are held from longitudinal movement, of oppositely disposed sleeve sections against which the rollers bear, these sections being tapered on their faces confronting the rollers and projecting at opposite ends beyond the rollers, and means carried upon the journal box and longitudinally adjustable, and a head mounted upon the end of the journal box and longitudinally adjustable with relation thereto and bearing against the ends of adjacent sleeve sections.

7. The combination with a journal and a journal box, of a sleeve extending longitudinally of and surrounding the journal and having longitudinal movement relative thereto, the sleeve being formed with a transversely concave, circumferential groove on its exterior face, said sleeve being formed in two longitudinally extending sections, anti-friction bearing rollers disposed exteriorly of the sleeve and having rolling engagement therewith, each roller having a transversely convex, peripheral flange fitting loosely in the groove of the sleeve and preventing longitudinal movement of the rollers, each of said flanges being formed with uniformly spaced, relatively shallow peripheral teeth and the grooves in the sleeve being formed with uniformly spaced pockets adapted to receive said teeth, the rollers being uniformly spaced from each other and held in their spaced relation by the engagement of the teeth with said pockets, a sleeve exterior to said rollers and formed of two sections bearing against the flanges on the rollers, said sleeve sections being tapered on their inner faces and extending beyond the rollers, longitudinally adjustable heads on the ends of the journal box and bearing against the ends of the sleeve sections, and a cylindrical member exterior to said last named sleeve and held from rotary movement and formed with an interiorly facing, circumferential groove having relatively shallow pockets at intervals to receive the teeth on the rollers.

8. A journal, a journal box including a tubular body concentric to the journal, bearing rollers disposed between the journal and the body, means whereby the rollers may be held in circumferential spaced relation and from longitudinal movement, a sleeve surrounding the journal and a sleeve surrounding the bearing rollers, one of said sleeves being composed of two tapering sections shiftable longitudinally relative to the rollers to take up wear, said tapering sleeve sections extending beyond the ends of the rollers, and a head for the journal box mounted for longitudinal adjustment thereon and engaging the projecting ends of the tapering sections whereby to adjustably shift said tapering sections.

9. A journal, a journal box including a tubular member concentric to the journal, bearing rollers disposed between the journal and the tubular member, each of said rollers having a circumferential flange formed on its periphery with a series of teeth, a sleeve surrounding the journal, and a sleeve surrounding the bearing rollers, one of said sleeves being composed of tapering sections shiftable longitudinally to take up wear, one of said sleeves and the tubular member being formed with a circumferential groove to receive the circumferential flanges on the rollers, said groove being formed with teeth to mesh with the teeth on said flanges, and means carried by the journal box whereby said tapering sleeve sections may be shifted longitudinally to take up wear.

In testimony whereof I hereunto affix my signature.

GEORGE W. DENTON.